(12) United States Patent
Datla

(10) Patent No.: US 9,094,440 B1
(45) Date of Patent: Jul. 28, 2015

(54) SYSTEMS AND METHODS FOR PROVIDING A COMMUNICATION PLATFORM FOR E-COMMERCE

(71) Applicant: Moxtreme Corp., Santa Clara, CA (US)

(72) Inventor: Sanjeev Kumar Datla, San Jose, CA (US)

(73) Assignee: MOXTREME CORP., Santa Clara, CA (US)

(*) Notice: Subject to any disclaimer, the term of this patent is extended or adjusted under 35 U.S.C. 154(b) by 0 days.

(21) Appl. No.: 14/618,858

(22) Filed: Feb. 10, 2015

(51) Int. Cl.
*G06F 15/16* (2006.01)
*H04L 29/08* (2006.01)
*H04L 29/06* (2006.01)
*G06F 12/00* (2006.01)

(52) U.S. Cl.
CPC .............. *H04L 67/141* (2013.01); *H04L 29/06* (2013.01)

(58) Field of Classification Search
USPC .................................. 709/203, 223–229, 250
See application file for complete search history.

(56) References Cited

U.S. PATENT DOCUMENTS

| 9,043,388 | B2* | 5/2015 | Bulut et al. | 709/203 |
| 2006/0058068 | A1* | 3/2006 | Barrow | 455/561 |
| 2011/0238578 | A1* | 9/2011 | Hurry | 705/65 |
| 2013/0080775 | A1* | 3/2013 | Liebmann et al. | 713/168 |
| 2013/0346595 | A1* | 12/2013 | Bulut et al. | 709/224 |
| 2014/0156375 | A1* | 6/2014 | Vaughan et al. | 705/14.38 |

* cited by examiner

*Primary Examiner* — Zarni Maung
(74) *Attorney, Agent, or Firm* — Pillsbury Winthrop Shaw Pittman LLP

(57) ABSTRACT

Systems and methods to facilitate communication between users may use communication channels and/or communication sessions that are accessed through a network address, including but not limited to a universal resource locator (URL). Individual communication channels may regard a particular purpose. Individual communication sessions may regard a particular purpose. Each user taking part in an exchange of information may choose to remain anonymous. Each user taking part in an exchange of information may prevent being contacted and/or exchanging information through a particular communication channel at any moment of the user's choosing.

28 Claims, 7 Drawing Sheets

SYSTEMS AND METHODS FOR PROVIDING A COMMUNICATION PLATFORM FOR E-COMMERCE

FIELD

The disclosure relates to systems and methods for providing and/or enabling a communication platform and, in particular, communication for e-commerce, social and professional networking and ad hoc interaction.

BACKGROUND

Accessing web pages and/or servers that present web pages via the internet is common. Communication between users and/or client computing platforms via the internet is common. Presenting information to client computing platforms is known. Communication between users that requires prior authorization by the users is known. Users may access functionality, provided via a network, through web pages and/or mobile applications. Web pages and/or mobile applications may include content presented by servers. Servers may serve web pages to client computing platforms. Using a browser software application to present content to a user on a client computing platform is known.

SUMMARY

One aspect of the disclosure relates to systems configured to provide and/or facilitate a communication platform. Communication platforms may enable communication between users (and/or between client computing platforms that are associated with users). The communication may be real-time and/or instantaneous, and/or may appear to be real-time or instantaneous. The system may be deployed, at least in part, using a public network and/or using commercial web services. Communication may be referred to as an exchange of information. In some embodiments, one or more users involved in a particular exchange of information may be anonymous to one or more other users involved in the particular exchange of information. In some embodiments, one or more users involved in a particular exchange of information may be pseudonymous to one or more other users involved in the particular exchange of information. As used in this disclosure, the term "pseudonymous" may refer to a user only being known by and/or referred to a name, username, handle, alias, etc. of his or her selection, until and unless the user decides otherwise.

The system may provide and/or facilitate communication between different types of users. The different types of users may include initiating users, reciprocating users, and/or other types of users. Initiating users may initiate and/or originate exchanges of information. For example, originating users may publish, post, and/or otherwise make available information to others, pertaining to a topic or reason for an exchange of information, and/or pertaining to a manner in which others may engage in an exchange of information. Reciprocating users may reciprocate, react, and/or respond to initiating users, actions by initiating users, and/or information form initiating users.

For example, an originating user may post a message—or other type of information, e.g. an image—on a (publicly accessible) online forum, a website, and/or a social network, the message regarding a particular purpose. Purposes may include items, objects, and/or services for sale, requests for information and/or advice, sharing of information, commercial offers, transactions, engagements between users, and/or other reasons why the originating user may want to exchange information with someone. Individual purposes may be associated with a scope and/or context, such that a particular purpose may be only real, active, and/or valid within the associated scope and/or context. For example, the scope of a particular transaction or engagement may be limited to a particular geographical area. For example, the context of a particular sale of an item may be limited to the moment that item has been sold and/or is otherwise no longer for sale. The originating user may look for someone to contact him or her regarding the particular purpose and/or the particular posted message. However, the originating user may not wish to share personal identification information, personal contact information, and/or other information that may be used to identify and/or contact the initiating user beyond the scope and/or context of the particular purpose, and/or beyond any particular moment of the originating user's choosing. Personal identification information may include, by way of non-limiting example, a name, a username, a handle, an alias, and/or other information that may be used to identify a user, e.g. online and/or in the real world. Personal contact information may include, by way of non-limiting example, an email address, a phone number, and/or other information that may be used to contact a user, e.g. online and/or in the real world. The system may be configured to secure and safeguard personal identification information and/or personal contact information associated with users, user accounts, and/or identifiers of users and/or user accounts, before, during, and after the exchange of information between users.

Reciprocating users may be interested in purposes from originating users. A reciprocating user may look to contact an initiating user regarding a particular purpose and/or a particular posted message. However, the reciprocating user may not wish to share personal identification information, personal contact information, and/or other information that may be used to identify and/or contact the reciprocating user beyond the scope and/or context of the particular purpose, and/or beyond any particular moment of the reciprocating user's choosing. The system may be configured to secure and safeguard personal identification information and/or personal contact information associated with users, user accounts, and/or identifiers of users and/or user accounts, before, during, and after the exchange of information between users.

The system may include a server that communicates with, by way of non-limiting example, one or more client computing platforms that are associated with one or more users, one or more networks, and/or other entities described herein. Individual users may interact, e.g. through browser software applications being executed on client computing platforms, with one or more servers. Individual users may interact, e.g. through browser software applications being executed on client computing platforms, with other users. By way of non-limiting example, the one or more networks may include the internet, and/or other networks.

Client computing platforms may include one or more processors configured to execute computer program components. The computer program components may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a mobile telephone, a "smart phone", a tablet, a mobile computing platform, a gaming console, an electronic device, and/or other computing platforms. Originating users, reciprocating users, and/or other users may exchange information using any of the computing platforms described in this disclosure, and/or any combination of computing platforms described in this disclosure.

The exchange of information may be based on, implemented as, and/or included in one or more web pages. A web page is a document or information resource, e.g. in the form of an electronic file and/or a stream of electronic information. As used herein, information presented through a mobile application (or app) is included in the term web page. As used herein, streaming information presented through a mobile application (or app) is included in the term web page. Web pages may be rendered, interpreted, and/or displayed for presentation on a computing platform, such as a client computing platform. As used herein, displaying information through a mobile application (or app) is included in the term presentation. Presentation of web pages may be supported through a display, screen, or monitor of the computing platform. Web pages may be hosted by a remote web server (e.g. connected to the internet and/or one or more other networks). Web pages may be accessed through a browser software application being executed on a computing platform. As used herein, mobile applications such as apps are included in the term browser software application. Web pages may be static, e.g. stored using electronic storage that is accessible by a web server, dynamic, e.g. constructed when requested, and/or a combination of both. The browser software application may be configured to render, interpret, and/or display one or more web pages for presentation on a computing platform. A set of linked and/or organized web pages may form a website.

A website may include a set of related and/or linked web pages hosted on one or more web servers and accessible via a network, e.g. the internet. Websites and/or web pages may be accessible through a network address called a uniform resource locator (URL).

The server may include one or more processors configured to execute computer program components. The computer program components may include an account management component, a channel management component, an identity management component, an address generation component, a communication request component, a communication session component, an authorization component, a presentation component, a statistics component, and/or other components.

The account management component may be configured to manage user accounts. The user accounts may include account information of initiating users. Individual user accounts may be associated with account-level identifiers. Account-level identifiers may identify user accounts. For example, an account-level identifier may be a username for a user account. The user accounts may include a first user account, a second user account, a third user account, and so forth. A particular user account may be associated with one or more initiating users, for example a first initiating user, a second initiating user, a third initiating user, and so forth.

In some embodiments, user accounts may be related to other user accounts, for example in a particular hierarchy. For example, a business owner and/or manager may have a first user account, and several employees of the business owned by the business owner (or of the manager) may have one or more employee user accounts that are related to the first user account of the business owner/manager. In some embodiments, account information related to one or more employee user accounts may be accessible and/or visible to the first user account of the business owner/manager. For example, the several employees may be salespeople. Individual salespeople may be individual initiating users associated with individual user accounts.

The channel management component may be configured to obtain requests for creation of communication channels. The channel management component may be configured to obtain requests and/or other information from initiating users and/or other users. The channel management component may be configured to obtain requests and/or other information from client computing platforms, including but not limited to client computing platforms associated with initiating users. The channel management component may be configured to obtain channel-level identifiers. Channel-level identifiers may identify communication channels. For example, individual channel-level identifiers may identify individual communication channels. Communication channels may be associated with initiating users. For example, a particular communication channel may be associated with a particular initiating user, including but not limited to the initiating user from whom the request for creation of the particular communication channel has been obtained. In some embodiments, obtained channel-level identifiers may be associated with and/or based on requests obtained by the channel management component. In some embodiments, channel-level identifiers may be independent from account-level identifiers of associated initiating users. For example, a first initiating user may request the creation of a first communication channel. This request may be obtained by the channel management component. The first initiating user may be associated with a first account-level identifier. The first communication channel may be associated with a first channel-level identifier. The first channel-level identifier may be independent from the first account-level identifier. For example, based merely on knowledge of the first channel-level identifier, a user cannot determine the first account-level identifier, and vice versa.

The identity management component may be configured to manage, store, and/or track associations between channel-level identifiers and account-level identifiers. The identity management component may be configured to add, delete, remove, modify, adjust, and/or otherwise change associations between channel-level identifiers and account-level identifiers.

The address generation component may be configured to generate network addresses, including but not limited to channel network addresses. Generated network addresses may be based on requests obtained by the channel management component and/or by other components. Generated network addresses may be generated responsive to requests obtained by the channel management component. Generated network addresses may be based on channel-level identifiers and/or other identifiers. Channel network addresses may be associated with channel-level identifiers. In some embodiments, channel network addresses may include channel-level identifiers. In some embodiments, network addresses may be universal resource locators (URLs). In some embodiments, network addresses may be universal resource identifiers (URIs).

The communication request component may be configured to receive communication requests. The communication request component may be configured to receive communication requests from reciprocating users and/or other users. The communication request component may be configured to receive communication requests from client computing platforms, including but not limited to client computing platforms associated with reciprocating users. The communication request component may be configured to receive communication requests to open, start, initiate, facilitate, establish, and/or otherwise activate communication sessions. The communication request component may be configured to receive a communication request to open, start, initiate, facilitate, establish, and/or otherwise activate a communication session through a communication channel. Communication requests may be received at channel network addresses.

For example, a communication request may be received through engagement of a particular channel network address by a browser application on a particular client computing platform associated with a particular reciprocating user. For example, the particular reciprocating user is browsing on his particular client computing platform, through his browser application. The particular reciprocating user clicks on a link to the particular channel network address (and/or enters the particular channel network address as the destination for his browser application). The browser application engages the particular channel network address, and, in doing so, the communication request component receives a communication request at the particular channel network address to open a communication session. The particular channel network address is associated with a particular channel-level identifier. The communication request to open a communication session pertains to a communication session through the particular communication channel that is identified by the particular channel-level identifier. The particular channel-level identifier is associated with a particular account-level identifier (and thus a particular user account and a particular initiating user).

The communication session component may be configured to open, start, initiate, facilitate, establish, and/or otherwise activate communication sessions through communication channels. Communication channels may enable exchange of information between reciprocating users and initiating users. Communication channels may enable exchange of information between client computing platforms. The communication session component may be configured to exchange information through communication channels. The communication session component may be configured to exchange information between one or more initiating users and one or more reciprocating users through one or more communication channels. The communication session component may be configured to exchange information in real-time and/or instantaneously, or in a manner that may appear to be real-time and/or instantaneous.

The authorization component may be configured to authorize access to user accounts. The authorization component may be configured to authorize access to the system by initiating users. The authorization component may be configured to impose access restrictions to initiating users regarding the creation and/or use of communication channels. For example, an initiating user may need to enter a password and/or other secure login information to access his or her user account.

The presentation component may be configured to generate and/or present user interfaces to users, including but not limited to initiating users and reciprocating users. In some embodiments, the presentation component may be configured to generate and/or present one or more user interfaces responsive to and/or in conjunction with a communication session being opened, started, initiated, facilitated, established, and/or otherwise activated.

The statistics component may be configured to obtain and/or determine session-specific, channel-specific, and/or user-specific parameters related to the usage and/or operation of the system. By way of non-limiting example, the parameters may indicate and/or reflect durations of time and/or other parameters related to the usage and/or operation of the system. The durations may include the time between distinct moments in the usage and/or operation of the system. For example, moments may include the receipt of a channel creation request, the storage of an association between a channel-level identifier and an account-level identifier, the generation of a network address, the receipt of a communication request, the establishment of a communication session, the exchange of information through a communication channel, the exchange of information by a particular user, the beginning and/or end of a particular exchange of information between two users, and/or other moments. For example, a duration may indicate the time between the receipt of a communication request and the exchange of information by an initiating user in response thereto (this may be referred to as response time). In some embodiments, the statistics component may be configured to obtain and/or determine aggregate values of one or more parameters related to the usage and/or operation of the system. For example, an aggregate value may be the number of communication sessions that a particular initiating user has participated in, within a particular span of time. For example, an aggregate value may be the average response time for a particular initiating user. For example, an aggregate value may be the average call time for audio calls involving a particular initiating user.

As used in this disclosure, the term "real-time" may refer to accomplishing and/or performing a step, a process, a request, a response, an evaluation, and/or another task on-demand and within a predetermined period. In some embodiments, the predetermined period for real-time interaction may be 30 seconds, 20 seconds, 10 seconds, 5 seconds, 2 seconds, 1 second, 0.5 seconds, 0.25 seconds, 0.1 seconds, and/or another suitably interactive period for on-demand completion of a step, a process, a request, a response, an evaluation, and/or another task.

As used herein, the term "determine" (and derivatives thereof) may include measure, calculate, compute, estimate, approximate, generate, and/or otherwise derive, and/or any combination thereof. As used herein, the term "obtain" (and derivatives thereof) may include active and/or passive retrieval, determination, derivation, transfer, upload, download, submission, and/or exchange of information, and/or any combination thereof.

As used herein, any association (or correspondency) involving users, user accounts, account-level identifiers, channel creation requests, channel-level identifiers, communication channels, communication requests, communication sessions, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

The functionality of the system is not intended to be limited by any of the examples herein. It is contemplated that information and/or results from any component may be used in any other component, combined with information and/or results from any component, and so forth.

These and other objects, features, and characteristics of the servers, systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise. As used in the specification and in the claims, in a list of items that includes the separator "and/or", combinations of those items, insofar as practically possible, are envisioned as embodiments.

DETAILED DESCRIPTION

Figure 1:
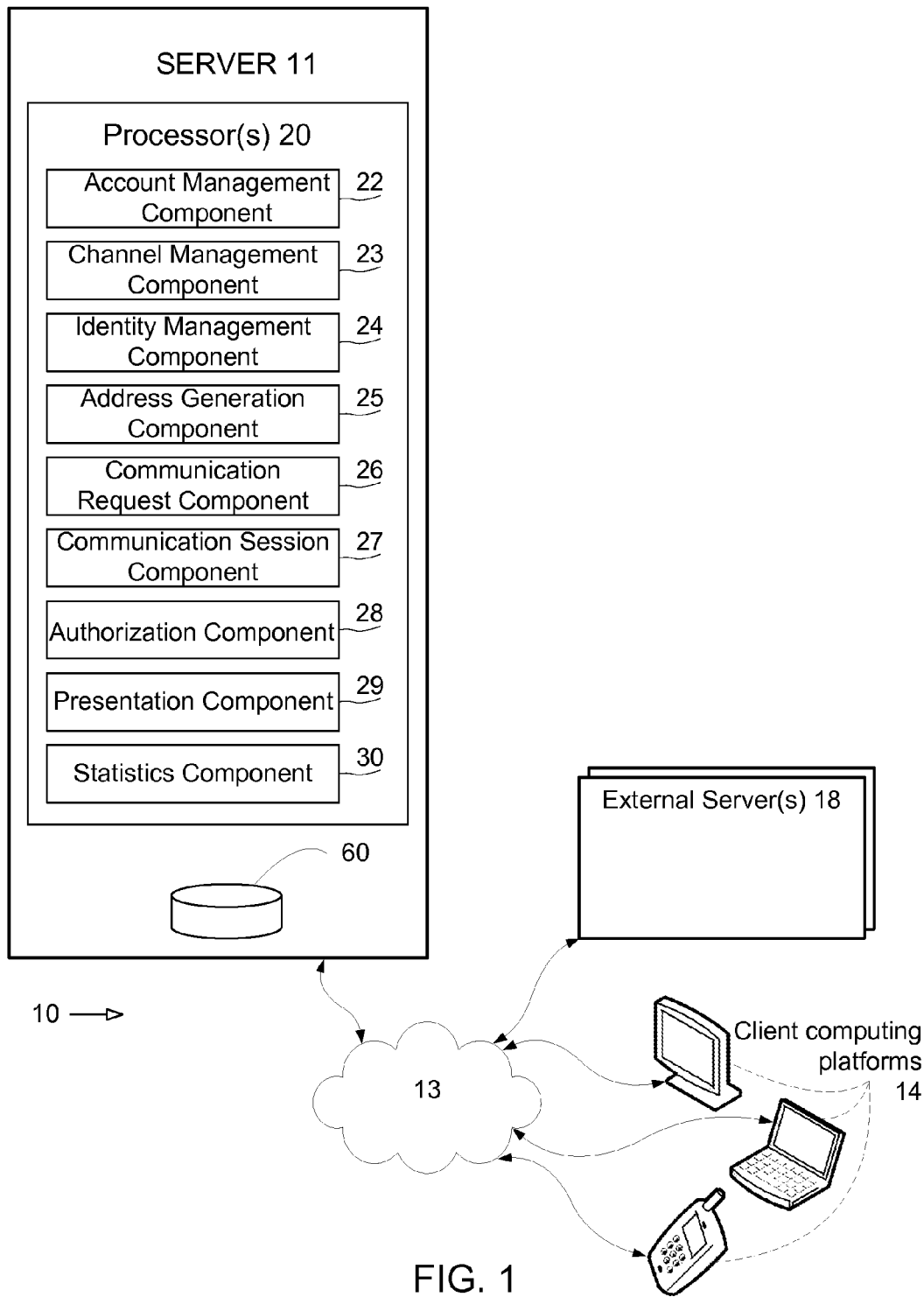
FIG. 1 illustrates a system configured to facilitate communication between users in accordance with one or more embodiments.

FIG. 1 illustrates a system 10 configured to provide and/or facilitate communication between users. System 10 may facilitate communication between users, servers, client computing platforms, and/or other people and/or entities. By virtue of the features described in this disclosure, users may exchange information while safeguarding personal identification information and/or personal contact information as desired. The communication may be real-time and/or instantaneous, and/or may appear to be real-time or instantaneous. System 10 may be deployed, at least in part, using a network 13 (e.g., a public network), and/or using commercial web services. Communication may be referred to as an exchange of information. In some embodiments, one or more users involved in a particular exchange of information may be anonymous to one or more other users involved in the particular exchange of information. In some embodiments, one or more users involved in a particular exchange of information may be pseudonymous to one or more other users involved in the particular exchange of information.

The system may provide and/or facilitate communication between different types of users, including but not limited to initiating users, reciprocating users, and/or other users. Referring to FIG. 1, system 10 may include one or more servers 11, one or more client computing platforms 14, one or more external servers 18, electronic storage 60, one or more processors 20, and/or other components. The components in FIG. 1 may be communicatively coupled through one or more networks 13, including but not limited to the Internet. Server 11 may include one or more of the processors 20, electronic storage 60, and/or other components.

One or more processors 20 may be configured to execute computer program components. The computer program components may include an account management component 22, a channel management component 23, an identity management component 24, an address generation component 25, a communication request component 26, a communication session component 27, an authorization component 28, a presentation component 29, a statistics component 30, and/or other components.

One or more processors 20 may be configured to provide information processing capabilities in system 10 and/or server 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some embodiments, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although components 22-30, are illustrated in FIG. 1 as being co-located within a single processing unit, in embodiments in which processor 20 includes multiple processing units, one or more of components 22-30 may be located remotely from the other components. The description of the functionality provided by the different components 22-30 described herein is for illustrative purposes, and is not intended to be limiting, as any of components 22-30 may provide more or less functionality than is described. For example, one or more of components 22-30 may be eliminated, and some or all of its functionality may be provided by other ones of components 22-30. As another example, processor 20 may be configured to execute one or more additional components that may perform some or all of the functionality attributed herein to one of components 22-30.

Electronic storage 60 of system 10 in FIG. 1 may comprise electronic storage media that stores information. The electronic storage media of electronic storage 60 may include one or both of system storage that is provided integrally (i.e., substantially non-removable) with server 11 and/or removable storage that is removably connectable to server 11 via, for example, a port (e.g., a USB port, a FireWire™ port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Electronic storage 60 may include virtual storage resources, such as storage resources provided via a cloud and/or a virtual private network. Electronic storage 60 may store software algorithms, information determined by processor 20, information received via client computing platforms 14, and/or other information that enable server 11 and system 10 to function properly. Electronic storage 60 may be separate components within system 10, or electronic storage 60 may be provided integrally with one or more other components of system 10 (e.g., processor 20).

External servers 18 may include Session Traversal Utilities for NAT (STUN) servers, Traversal Using Relays around NAT (TURN) servers, Extensible Messaging and Presence Protocol (XMPP) servers, email servers, and/or other servers.

Account management component 22 may be configured to manage user accounts. The user accounts may include account information of initiating users. Individual user accounts may be associated with account-level identifiers. Account-level identifiers may identify user accounts. For example, an account-level identifier may be a username for a user account. The user accounts may include a first user account, a second user account, a third user account, and so forth. A particular user account may be associated with one or more initiating users, for example a first initiating user, a second initiating user, a third initiating user, and so forth.

In some embodiments, user accounts may be related to other user accounts, for example in a particular hierarchy. For example, a business owner and/or manager may have a first user account, and several employees of the business owned by the business owner (or of the manager) may have one or more employee user accounts that are related to the first user account of the business owner/manager. In some embodiments, account information related to one or more employee user accounts may be accessible and/or visible to the first user account of the business owner/manager. For example, the several employees may be salespeople. Individual salespeople may be individual initiating users associated with individual user accounts.

In some embodiments, account management component 22 may be configured to obtain and/or receive identifiers that identify initiating users. For example, a particular initiating user may provide a particular identifier that is to be used during the exchange of information with one or more reciprocating users. The initiating user may be anonymous to the reciprocating users. For example, a particular reciprocating user may only know the particular initiating user by the particular identifier, and may not know nor have access to personal identification information or personal contact information of the initiating user. In particular, the particular reciprocating user may not know the account name or account-level identifier of the user account of the initiating user.

Figure 7:
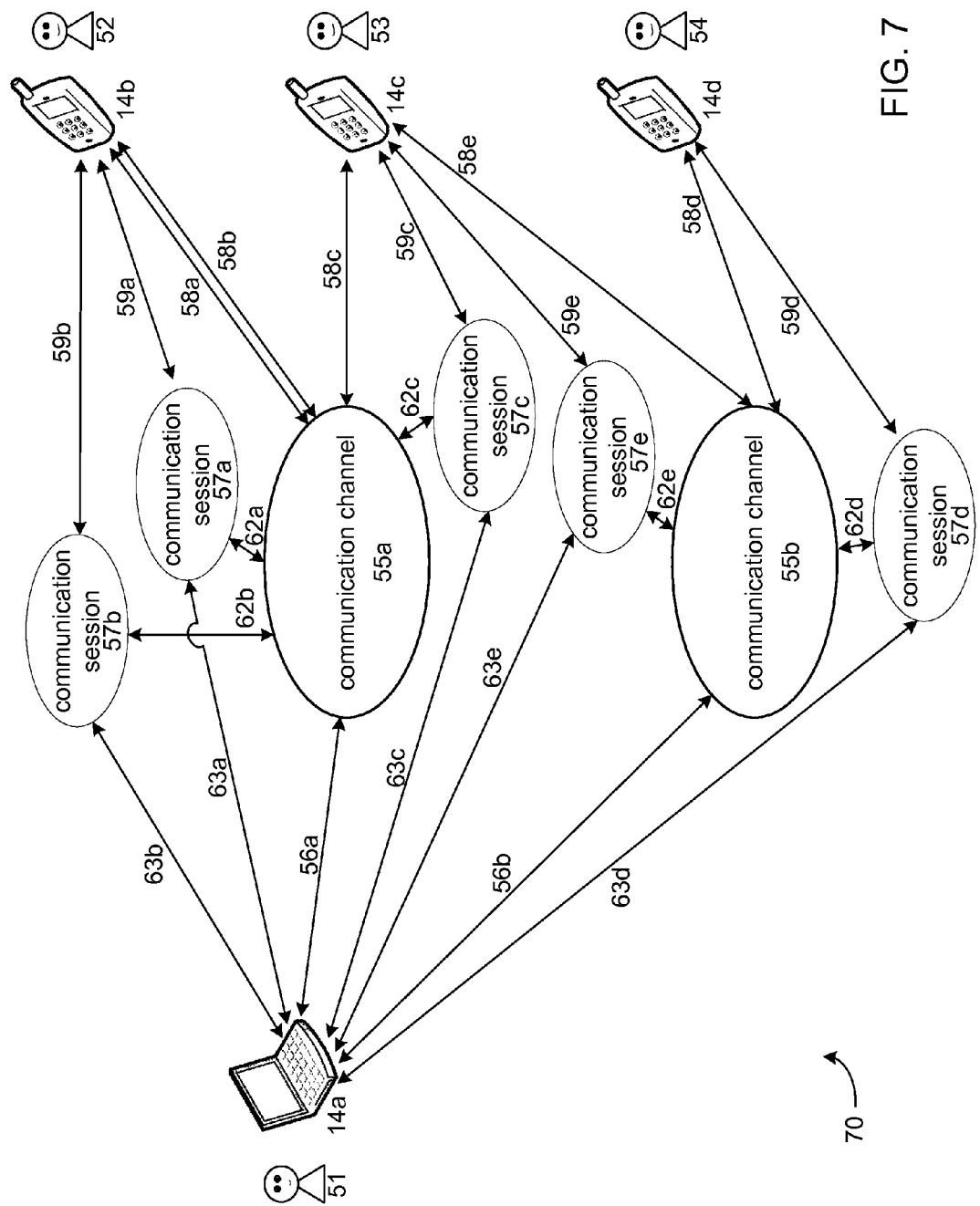
FIG. 7 illustrates an exemplary interaction between users, communication channel, and communication sessions in accordance with one or more embodiments.

By way of non-limiting example, FIG. 7 illustrates an exemplary interaction 70 between users, communication channel, and communication sessions. Initiating user 51 may be associated with client computing platform 14a. Initiating user 51 may be associated with a particular user account, which may be accessed through client computing platform 14a.

Referring to FIG. 1, channel management component 23 may be configured to obtain requests for creation of communication channels. Requests for creation of communication channels may be referred to as channel requests and/or channel creation requests. Channel management component 23 may be configured to obtain requests and/or other information from initiating users and/or other users. Channel management component 23 may be configured to obtain requests and/or other information from client computing platforms 14, including but not limited to client computing platforms associated with initiating users. Channel management component 23 may be configured to obtain channel-level identifiers. Channel-level identifiers may identify communication channels. For example, individual channel-level identifiers may identify individual communication channels. Communication channels may be associated with initiating users. For example, a particular communication channel may be associated with a particular initiating user, including but not limited to the initiating user from whom the request for creation of the particular communication channel has been obtained. In some embodiments, obtained channel-level identifiers may be associated with and/or based on requests obtained by channel management component 23. In some embodiments, channel-level identifiers may be independent from account-level identifiers of associated initiating users. For example, a first initiating user may request the creation of a first communication channel. This request may be obtained by channel management component 23. The first initiating user may be associated with a first account-level identifier. The first communication channel may be associated with a first channel-level identifier. The first channel-level identifier may be independent from the first account-level identifier. For example, based merely on knowledge of the first channel-level identifier, a user cannot determine the first account-level identifier, and vice versa.

By way of non-limiting example, FIG. 7 illustrates exemplary interaction 70 between users, communication channel, and communication sessions. Initiating user 51 may request, through client computing platform 14a, creation of a communication channel. Such a request 56a may be received by channel management component 23 (shown in FIG. 1).

In some embodiments, a request for creation of a particular communication channel may specify, include, and/or be associated with one or more communication types that are, will be, and/or are requested to be available as types of communication on the particular communication channel. The exchange of information using the particular communication channel may be supported using all or some of the one or more communication types. Communication types may include one or more of text messaging, bi-directional audio, video, bi-directional video, digital files, location information, context, data, streaming data, combinations of communication types and/or other types of information that may be exchanged between users. In some embodiments, initiating users may request a modification of the one or more communication types associated with a particular communication channel. A request for such a modification may be referred to as a channel modification request.

Referring to FIG. 1, in some embodiments, a request for creation of a particular communication channel may specify, include, and/or be associated with a description of a timeframe of availability. During the timeframe, the exchange of information using the particular communication channel may be supported by system 10. Outside the timeframe, the exchange of information using the particular communication channel may be unsupported by system 10. In some embodiments, the timeframe may be defined using particular days of the week or month. Alternatively, and/or simultaneously, in some embodiments, the timeframe may be defined using particular hours and timeslots for one or more days. In some embodiments, initiating users may be able to control and/or modify timeframes of availability per communication channel, per communication session, per reciprocating user, per a particular identifier used when communication channels were created, and/or any combination thereof.

For example, channel management component 23 may be configured to receive, from a client computing platform 14 that is associated with a particular initiating user, a first request for creation of a first communication channel and a second request for creation of a second communication channel. The particular initiating user may exchange information simultaneously and/or concurrently using the first communication channel and the second communication channel.

By way of non-limiting example, FIG. 7 illustrates exemplary interaction 70 between users, communication channel, and communication sessions. Initiating user 51 may effectuate a first request 56a and a second request 56b for creation of a first and second communication channel, respectively. For example, initiating user 51 may have a first purpose for the first communication channel and a second purpose for the second communication channel.

Figure 5:
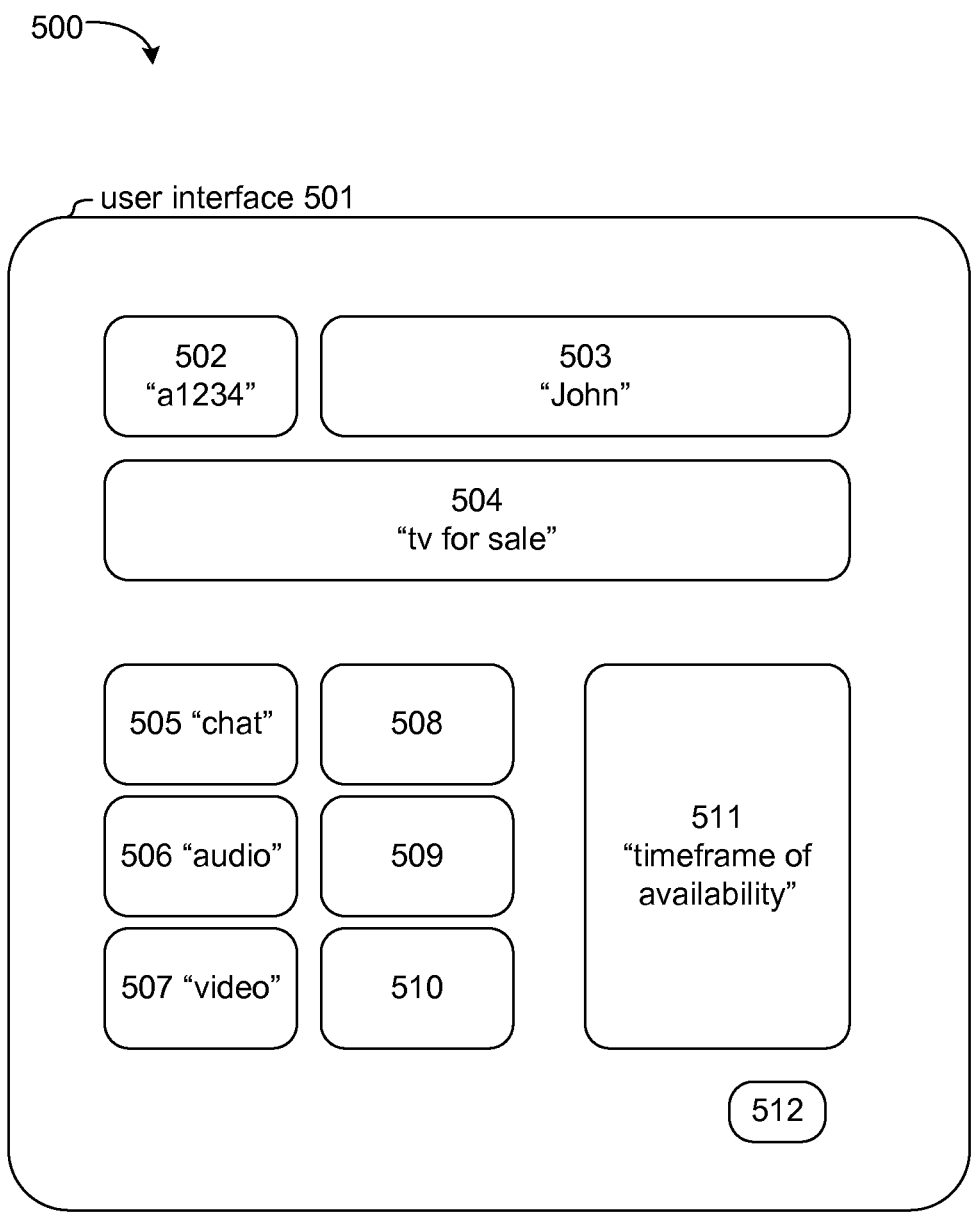
FIGS. 5-6 illustrate exemplary user interfaces used in a system to facilitate communication between users in accordance with one or more embodiments.

By way of illustration, FIG. 5 illustrates a view 500 of a user interface 501 as may be presented to an initiating user, e.g. the particular initiating user, to request creation of a communication channel. User interface 501 may be presented through a client device such as client computing platform 14 (depicted in FIG. 1). User interface 501 may be presented in response to the particular initiating user interacting with system 10, including but not limited to being authorized by account management component 22, authorization component 28, and/or other components of system 10. Elements of user interface 501 may be implemented as fields configured to receive entry, selection, and/or confirmation from, e.g., an initiating user. The fields may include one or more of a text entry field, a set of selectable menu items, a selectable field, and/or other fields configured to receive entry, selection, confirmation from a user, and/or user interaction. The number of elements, components, and/or (user-selectable) fields depicted in FIG. 5 is meant to be exemplary, and not limiting in any way. User interface 501 may be configured to present information to and/or enable interaction with the initiating user.

User interface 501 of FIG. 5 may include interface elements 502, 503, 504, 508, 509, 510, and 511, informational element 505, 506, and 507, action button 512, and/or other components or features. Interface elements 502, 503, 504, 508, 509, 510, and 511 may be, e.g., an object, interface, and/or other items that a user may interact with, such as a menu of user-selectable options and/or actions for engaging the system.

For example, interface element 502 may display an identifier, e.g. "a1234", that identifies the user. In some embodiments, the identifier may be uniquely associated with a user. In some embodiments, the identifier may be alphanumerical. In some embodiments, interface element 502 may not be changeable by the user. For example, the identifier displayed in interface element 502 may be used to form a channel-level identifier and/or a network address, including a channel network address. For example, interface element 503 may display an identifier (e.g., "John" or "John's craigslist"), and/or other information related to a communication channel and/or its purpose. For example, the identifier entered and/or displayed in interface element 503 may be used to form a channel-level identifier and/or a network address, including a channel network address. In some embodiments, the identifier entered and/or displayed in interface element 503 may be used to establish a communication session and/or identify an initiating user to a reciprocating user. For example, the particular initiating user may enter a pseudonym, alias, nickname, handle, and/or other identifier to be used for this communication channel. By virtue of selecting an identifier per communication channel, an initiating user may virtualize his or her identity as represented to the public. The initiating user may thus be able to determine and control whether any account-level identifiers (e.g., a name, username, handle, alias, etc.) is known or knowable to other users. Interface element 504 may display information (e.g., "tv for sale") related to a communication channel and/or its purpose. For example, the information entered and/or displayed in interface element 504 may provide details about an item for sale.

For example, informational elements 505, 506, and 507 may display available communication types for a particular communication channel, including but not limited to "chat," (for text messaging) "audio," (bi-directional simultaneous exchange of sound for phone calls) and "video". For example, interface elements 508, 509, and 510 may display controls (e.g., an "on/off" switch) related to informational elements 505, 506, and 507, respectively. Action button 512, upon activation by the user, may effect and/or confirm a user's request for creation of a communication channel in accordance with the selected options as indicated and/or reflected by the elements in user interface 501.

In some embodiments, user interface 501 may include interface element 511. For example, interface element 511 may display available definitions of a timeframe during which usage of the particular communication channel (and/or a particular communication session) may be supported. The particular initiating user may enter, select, and/or confirm a definition of a timeframe using interface element 511.

Referring to FIG. 1, identity management component 24 may be configured to manage, store, and/or track associations between channel-level identifiers and account-level identifiers. Identity management component 24 may be configured to add, delete, remove, modify, adjust, and/or otherwise change associations between channel-level identifiers and account-level identifiers. In some embodiments, responsive to an initiating user deleting an association and/or deleting a particular communication channel associated therewith, a reciprocating user can no longer use the particular communication channel, and/or can no longer exchange information with the initiating user through the particular communication channel. For example, in some embodiments, responsive to an initiating user deleting a particular communication channel, a reciprocating user can no longer use the particular communication channel to exchange information with the initiating user. In some embodiments, deleting a particular communication channel may have no effect on any other communication channels. For example, a reciprocating user may exchange information with the initiating user through a different communication channel that has not been deleted. In some embodiments, deleting a particular communication channel may have no effect on previously established and/or active communication sessions. In some embodiments, deleting a particular communication channel may have effectively delete or close previously established communication sessions associated with the deleted communication channel.

In some embodiments, responsive to an initiating user deleting an association and/or deleting a particular communication channel associated therewith, the initiating user can no longer use the particular communication channel, and/or can no longer exchange information with any reciprocating user through the particular communication channel.

Upon request and/or authorization by one or more initiating users, a particular association may be transferred from a first account-level identifier (associated with a first user account) to a second account-level identifier (associated with a second user account). In some embodiments, transferring a particular association may be temporary. For example, an initiating user may use this feature to forward a particular communication channel to another initiating user. In some embodiments, transferring a particular association may be permanent (or at least until another transfer). In some embodiments, transferring a particular association may transfer ownership of the particular communication channel.

In some embodiments, a first initiating user may refer a communication channel to another initiating user. For example, the first initiating user may send or otherwise transfer a particular channel-level identifier, a particular communication channel, and/or a particular channel network address to the second initiating user. Statistics component 30 may be configured to track session-specific, channel-specific, and/or user-specific parameters related to the usage and/or operation of system 10, in particular as related to the particular communication channel associated with the transferred particular channel-level identifier, particular communication channel, and/or particular channel network address. In some embodiments, statistics component 30 may be configured to distinguish between usage of the particular communication channel that is attributable to the first initiating user versus the second initiating user. For example, the first initiating user may send a channel network address to the second initiating user that is a similar but subtly modified version of the particular channel network address as originally generated upon creation of the particular communication channel.

Address generation component 25 may be configured to generate network addresses, including but not limited to channel network addresses. Generated network addresses may be based on requests obtained by channel management component 23 and/or by other components. Generated network addresses may be generated responsive to requests obtained by channel management component 23 and/or other components. Generated network addresses may be based on channel-level identifiers and/or other identifiers. Channel network addresses may be associated with channel-level identifiers. In some embodiments, channel network addresses may include channel-level identifiers. In some embodiments, network addresses may be universal resource locators (URLs). In some embodiments, network addresses may be universal resource identifiers (URIs).

By way of non-limiting example, FIG. 7 illustrates exemplary interaction 70 between users, communication channel, and communication sessions. Responsive to receipt of request 56a, a first channel network address may be generated (by address generation component 25, shown in FIG. 1) that is associated with a first communication channel 55a. Responsive to receipt of request 56b, a second channel network address may be generated (by address generation component 25, shown in FIG. 1) that is associated with a second communication channel 55a.

Referring to FIG. 1, a network address generated by address generation component 25 may be shared, published, posted, and/or otherwise made available to others in any way network addresses, URLs, and/or URIs may be represented, including but not limited to hyperlinks, barcodes, quick response (QR) codes, user interface elements, and/or other representations. The property of being available to others may be referred to as "publicly accessible." Engagement of a network address, by a particular reciprocating user associated with a particular client computing platform 14, may effectuate presentation, on the particular client computing platform 14, of a user interface configured to facilitate the exchange of information. In some embodiments, system 10 may not require authorization and/or login of reciprocating users. In some embodiments, reciprocating users do not need to be part of a private network to exchange information using a communication channel. In some embodiments, client computing platforms 16 of reciprocating users do not need to be in a particular state prior to the exchange of information using a communication channel. In some embodiments, browsing applications of reciprocating users do not need to be in a particular state prior to the exchange of information using a communication channel. For example, a default installation of a particular browsing application may support the exchange of information using a communication channel, without the need or requirement of installing applets, plugins, and/or other proprietary software. In some embodiments, the exchange of information through a communication channel may be based on and/or supported by Web Real-Time Communication (WebRTC).

In some embodiments, a generated network address may include different portions and/or sections that are combined. By way of non-limiting example, multiple portions and/or sections may be combined through concatenation. One or more portions and/or sections may be the same or similar for all or most communication channels form the same initiating user. One or more portions and/or sections may be generated based on an account-level identifier associated with a particular user account. One or more portions and/or sections may be generated based on a channel-level identifier associated with a particular user account. One or more portions and/or sections may be generated based on the one or more communication types associated with a particular communication channel. One or more portions and/or sections may be generated based on a particular timeframe of availability associated with a particular communication channel. One or more portions and/or sections may be generated based on an identifier associated with a particular purpose and/or other related information of a particular communication channel, including but not limited to any combination of the interface elements and the informational elements described in relation to FIG. 5.

Communication request component 26 may be configured to receive communication requests. Communication request component 26 may be configured to receive communication requests from initiating users, reciprocating users, and/or other users. Communication request component 26 may be configured to receive communication requests from client computing platforms 14, including but not limited to client computing platforms associated with reciprocating users. Communication request component 26 may be configured to receive communication requests to open, start, initiate, facilitate, establish, and/or otherwise activate communication sessions. Communication request component 26 may be configured to receive a communication request to open, start, initiate, facilitate, establish, and/or otherwise activate a communication session through a communication channel. Communication requests may be received at channel network addresses.

For example, a communication request may be received through engagement of a particular channel network address by a browser application on a particular client computing platform associated with a particular reciprocating user. For example, the particular reciprocating user is browsing on his particular client computing platform, through his browser application. The particular reciprocating user clicks on a link to the particular channel network address (and/or enters the particular channel network address as the destination for his browser application). The browser application engages the particular channel network address, and, in doing so, communication request component 26 receives a communication request at the particular channel network address to open a communication session. The particular channel network address is associated with a particular channel-level identifier. The communication request to open a communication session pertains to a communication session through the particular communication channel that is identified by the particular channel-level identifier. The particular channel-level identifier is associated with a particular account-level identifier (and thus a particular user account and a particular initiating user).

By way of non-limiting example, FIG. 7 illustrates exemplary interaction 70 between users, communication channel, and communication sessions. Reciprocating users 52, 53, and 54 may be associated with client computing platforms 14b, 14c, and 14c, respectively. Reciprocating user 52 may request, through client computing platform 14b, that a communication session is established through communication channel 55a. Such a communication request 58a may be received by communication request component 26 (shown in FIG. 1). Reciprocating user 52 may make a second communication request 58b that a communication session is established through communication channel 55a. Reciprocating user 53 may make a third communicating request 58c that a communication session is established through communication channel 55a. Note that both reciprocating user 52 and reciprocating user 53 may request that a communication session is established through the same communication channel, here communication channel 55a. Reciprocating user 54 may make a fourth communicating request 58d that a communication session is established through communication channel

55*b*. Reciprocating user 53 may make a fifth communicating request 58*e* that a communication session is established through communication channel 55*b*. Note that a reciprocating user, e.g. reciprocating user 52, may request a communication session is established through the same communication channel more than once, which may effectuate different communication sessions: communication sessions 57*a* and 57*b*. In some embodiments, communication sessions 57*a* and 57*b* may operate at the same time, for example by using different communication types per communication session.

Referring to FIG. 1, communication session component 27 may be configured to open, start, initiate, facilitate, establish, and/or otherwise activate communication sessions, e.g. through communication channels. Communication channels may enable exchange of information between reciprocating users and initiating users. Communication channels may enable exchange of information between client computing platforms 14. Communication session component 27 may be configured to exchange information through communication sessions and/or communication channels. Communication session component 27 may be configured to exchange information between one or more initiating users and one or more reciprocating users through one or more communication channels. Communication session component 27 may be configured to exchange information in real-time and/or instantaneously, or in a manner that may appear to be real-time and/or instantaneous. A communication session that has been opened, started, initiated, facilitated, established, and/or otherwise activated may be referred to as active until the communication session is closed, deleted, or deactivated.

By way of non-limiting example, FIG. 7 illustrates exemplary interaction 70 between users, communication channel, and communication sessions. Responsive to receipt of communication request 59*a* through client computing platform 14*b*, communication session component 27 (shown in FIG. 1) may establish (as indicated by a connection 62*a*) a communication session 57*a* (between client computing platform 14*a* and client computing platform 14*b*) that is based on and/or supported by communication channel 55*a*. In some embodiments, communication session 57*a* may be regarded as an instance of communication channel 55*a*. Regarding communication session 57*a*, exchange of information by client computing platform 14*b* may be indicated by exchange 59*a*, and exchange of information by client computing platform 14*a* may be indicated by exchange 63*a*.

Responsive to receipt of communication request 59*b* through client computing platform 14*b*, communication session component 27 (shown in FIG. 1) may establish (as indicated by a connection 62*b*) a communication session 57*b* (between client computing platform 14*a* and client computing platform 14*b*) that is based on and/or supported by communication channel 55*a*. In some embodiments, communication session 57*b* may be regarded as an instance of communication channel 55*a*. Regarding communication session 57*b*, exchange of information by client computing platform 14*b* may be indicated by exchange 59*b*, and exchange of information by client computing platform 14*a* may be indicated by exchange 63*b*. Note that a reciprocating user, e.g. reciprocating user 52, may request more than once that a communication session is established through the same communication channel, e.g. communication channel 55*a*. In some embodiments, a communication session may be reused, e.g. by reusing the same session network address. For example, information related to the exchange of information using a particular communication session may be retained and/or stored. For example, a chat history for a communication session may be retained and/or stored for future usage. In some embodiments, once a communication session has been closed, deleted, or deactivated, a subsequent communication request would open a new communication session. In some embodiments, either one or both of an initiating user and a reciprocating user may have control over whether chat history and/or other information related to the exchange of information using a particular communication session may be retained and/or stored for future usage or not. For example, an initiating user may control whether chat history is supported and/or available for a particular communication channel and/or a particular communication session, or not.

Responsive to receipt of communication request 59*c* through client computing platform 14*c*, communication session component 27 (shown in FIG. 1) may establish (as indicated by a connection 62*c*) a communication session 57*c* (between client computing platform 14*a* and client computing platform 14*c*) that is based on and/or supported by communication channel 55*a*. In some embodiments, communication session 57*c* may be regarded as an instance of communication channel 55*a*. Regarding communication session 57*c*, exchange of information by client computing platform 14*c* may be indicated by exchange 59*c*, and exchange of information by client computing platform 14*a* may be indicated by exchange 63*c*. Note that both reciprocating user 52 and reciprocating user 53 may exchange information through communication channel 55*a* with initiating user 51, e.g. at the same time.

Referring to FIG. 1, in some embodiments, operation of communication session component 27 may be based on peer-to-peer connections. In some embodiments, the information exchanged through communication channels neither is transferred through nor stored by public servers or publicly accessible servers. Regarding network address translation (NAT), in some embodiments, operation of communication session component 27 may be based on and/or supported by Session Traversal Utilities for NAT (STUN) servers, Traversal Using Relays around NAT (TURN) servers, Extensible Messaging and Presence Protocol (XMPP) servers, email servers, and/or other servers.

In some embodiments, communication session component 27 and/or address generation component 25 may be configured to generate session network addresses for communication sessions. In some embodiments, communication session component 27 and/or address generation component 25 may be configured to generate a session network address for a communication session responsive to receipt of a communication request. Session network addresses may be associated with channel network addresses, channel-level identifiers, and/or communication channels. In some embodiments, a session network address may be different than the associated channel network address. For example, a session network address may include the associated channel network address, concatenated with another identifier. In some embodiments, this identifier may be independent from the associated channel network address, its channel-level identifiers, and/or its communication channel. This identifier may be referred to as a session-level identifier. In some embodiments, a session network address may be independent from the associated channel network address.

Generated session network addresses may be based on requests obtained by communication request component 26 and/or by other components. Session network addresses may be generated responsive to requests obtained by communication request component 26 and/or other components. Generated network addresses may be based on channel-level identifiers, session-level identifiers, and/or other identifiers. Channel network addresses may be associated with channel-level identifiers. In some embodiments, channel network addresses may include channel-level identifiers. In some embodiments, network addresses may be universal resource locators (URLs).

By way of non-limiting example, FIG. 7 illustrates exemplary interaction 70 between users, communication channel, and communication sessions. Responsive to receipt of communication request 59d through client computing platform 14d, communication session component 27 (shown in FIG. 1) may establish (as indicated by a connection 62d) a communication session 57d (between client computing platform 14a and client computing platform 14d) that is based on and/or supported by communication channel 55b. In some embodiments, communication session 57d may be regarded as an instance of communication channel 55b. Regarding communication session 57d, exchange of information by client computing platform 14d may be indicated by exchange 59d, and exchange of information by client computing platform 14a may be indicated by exchange 63d. Note that both reciprocating user 52 and reciprocating user 54 may exchange information with initiating user 51 through different communication channels, communication channel 55a and communication channel 55b, e.g. at the same time.

Responsive to receipt of communication request 59e through client computing platform 14e, communication session component 27 (shown in FIG. 1) may establish (as indicated by a connection 62e) a communication session 57e (between client computing platform 14a and client computing platform 14c) that is based on and/or supported by communication channel 55b. In some embodiments, communication session 57e may be regarded as an instance of communication channel 55b. Regarding communication session 57e, exchange of information by client computing platform 14c may be indicated by exchange 59e, and exchange of information by client computing platform 14a may be indicated by exchange 63e. Note that a reciprocating user, e.g. reciprocating user 53, may exchange information with initiating user 51 through different communication channels and different communication sessions, communication channel 55a and communication session 57, as well as communication channel 55b and communication session 57e, e.g. at the same time.

Referring to FIG. 1, authorization component 28 may be configured to authorize access to user accounts. Authorization component 28 may be configured to authorize access to system 10 by initiating users. Authorization component 28 may be configured to authorize access to user accounts by one or more client computing platforms 14. Authorization component 28 may be configured to impose access restrictions to initiating users regarding the creation and/or use of communication channels. For example, an initiating user may need to enter a password and/or other secure login information to access his or her user account. In some embodiments, access to system 10 by reciprocating users (in particular to communication channels) may not need to be authorized. In other words, no access restrictions are imposed to reciprocating users. The functionality of the system is not intended to be limited by any of the examples herein. It is contemplated that functionality attributed to any component may be used in and/or performed by any other component. By way of non-limiting example, the functionality attributed to authorization component 28 may be performed by account management component 22, and so forth.

Presentation component 29 may be configured to generate and/or present user interfaces to users, including but not limited to initiating users and reciprocating users. In some embodiments, presentation component 29 may be configured to generate and/or present one or more user interfaces responsive to and/or in conjunction with a communication session being opened, started, initiated, facilitated, established, and/or otherwise activated. In some embodiments, a user interface for a particular communication session and/or a particular communication channel may include separate and distinct sections, portions, and/or tabs that may correspond to different communication types that are available and/or supported for the particular communication session and/or the particular communication channel.

Statistics component 30 may be configured to obtain and/or determine session-specific, channel-specific, and/or user-specific parameters related to the usage and/or operation of system 10. By way of non-limiting example, the parameters may indicate and/or reflect durations of time and/or other parameters related to the usage and/or operation of system 10. The durations may include the time between distinct moments in the usage and/or operation of system 10. For example, moments may include the receipt of a channel creation request, the storage of an association between a channel-level identifier and an account-level identifier, the generation of a network address, the receipt of a communication request, the establishment of a communication session, the exchange of information through a communication channel, the exchange of information by a particular user, the beginning and/or end of a particular exchange of information between two users, and/or other moments. For example, a duration may indicate the time between the receipt of a communication request and the exchange of information by an initiating user in response thereto (this may be referred to as response time).

In some embodiments, statistics component 30 may be configured to obtain and/or determine aggregate values of one or more parameters related to the usage and/or operation of system 10. For example, an aggregate value may be the number of communication sessions that a particular initiating user has participated in, e.g. within a particular span of time. For example, an aggregate value may be the number of video calls that a particular initiating user has participated in. For example, an aggregate value may be the average response time for a particular initiating user. For example, an aggregate value may be the average call time for audio calls involving a particular initiating user. In some embodiments, (aggregate) values of one or more parameters may be further refined, filtered, and/or otherwise narrowed down to limit the number and/or type of sessions, communication channels, initiating users, and/or reciprocating users for which the parameters are determined. For example, an aggregate value may be the average responsive time for exchange of information of a particular communication type, a particular timeframe during which exchanges are initiated and/or requested, a particular set of time zones of reciprocating users, a particular demographic, geographic, and/or other type of subset of reciprocating users, and/or combinations of multiple consecutive and/or simultaneous refinements and/or filtering. For example, the reciprocating and/or initiating users may be differentiated by one or more of demographic characteristics, geographic characteristics, stated interests, determined and/or expected interests, prior browsing activity, search history, and/or other ways to differentiate users. This list is exemplary and not intended to be limiting in any way. For example, the groups of users may be differentiated based on a particular geographic area that the users are based in, interested in, and/or have a relation with in any other manner.

In some embodiments, statistics component 30 may be configured to distinguish and track communication channels and/or communication sessions that have been transferred (e.g., forwarded), referred, and/or otherwise shared among multiple users.

Figure 6:
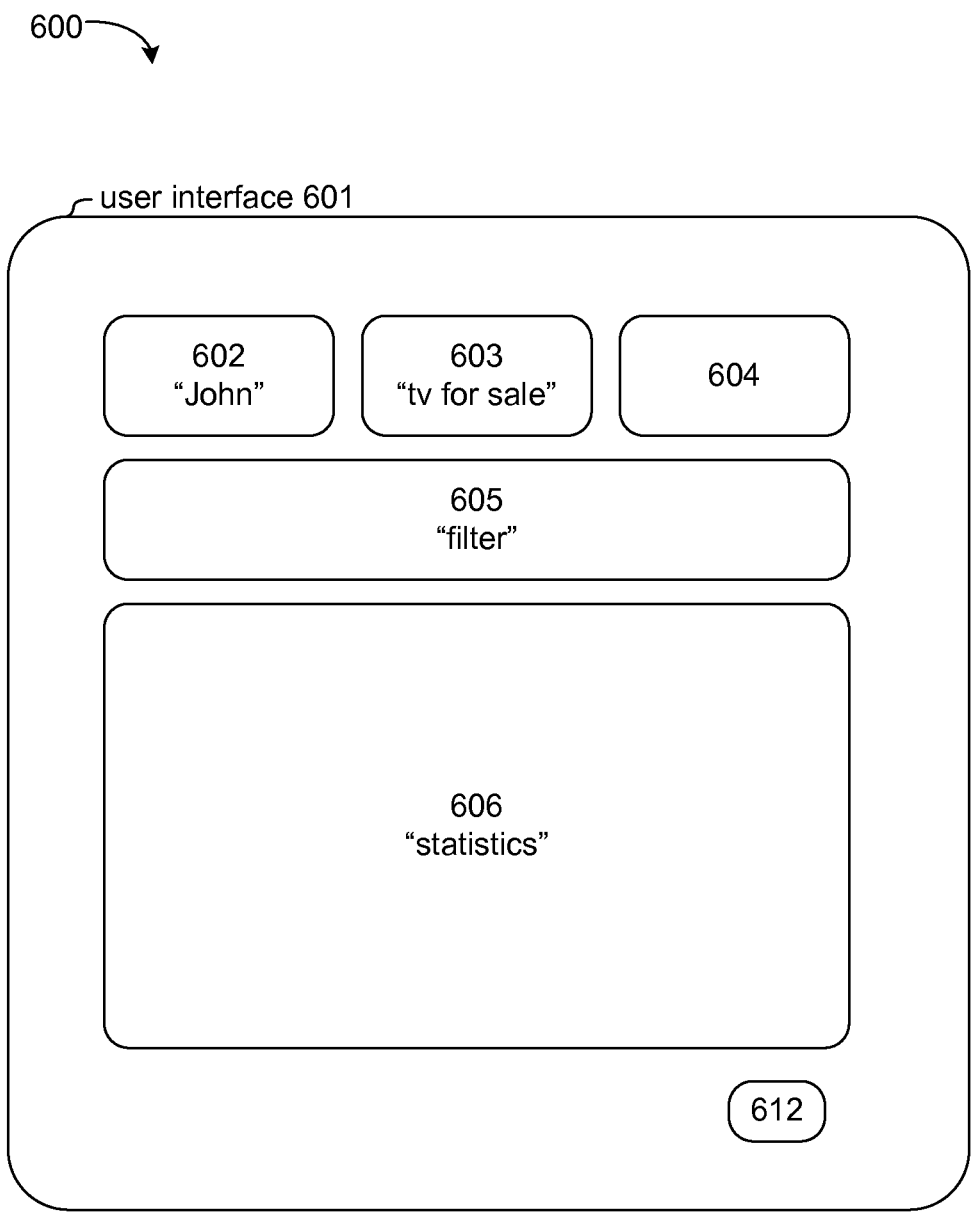

By way of illustration, FIG. 6 illustrates a view 600 of a user interface 601 as may be presented to an initiating user. User interface 601 may be presented through a client device such as client computing platform 14 (depicted in FIG. 1). User interface 601 may be presented in response to the particular initiating user interacting with system 10, including but not limited to being authorized by account management component 22, authorization component 28, and/or other components of system 10. Elements of user interface 601 may be implemented as fields configured to receive entry, selection, and/or confirmation from, e.g., an initiating user. The fields may include one or more of a text entry field, a set of selectable menu items, a selectable field, and/or other fields configured to receive entry, selection, confirmation from a user, and/or user interaction. The number of elements, components, and/or (user-selectable) fields depicted in FIG. 6 is meant to be exemplary, and not limiting in any way. User interface 601 may be configured to present information to and/or enable interaction with the initiating user.

User interface 601 of FIG. 6 may include interface elements 602, 603, 604, and 605, informational element 606, action button 612, and/or other components or features. Interface elements 602, 603, 604, and 605 may be, e.g., an object, interface, and/or other items that a user may interact with, such as a menu of user-selectable options and/or actions for engaging the system.

For example, interface element 602 may display an identifier, e.g. "John", that identifies a particular initiating user. The particular initiating user may have used, e.g. during a particular timeframe, different identifiers, different communication channels, and different communication sessions to exchange information with a set of reciprocating users. The particular initiating user may use interface element 602 to enter and/or select a particular identifier, e.g. an identifier that has been used during communication sessions. For example, the particular initiating user may have used a first identifier "John" and a second identifier "James" to exchange information with a set of reciprocating users. The particular initiating user may user interface element 603 to enter and/or select one or more particular communication channels, e.g. a communication channel that has been used during communication sessions. For example, interface element 603 may display an identifier (e.g., "tv for sale" or "John's craigslist"), and/or other information related to a particular communication channel and/or its purpose. The particular initiating user may use interface element 604 to enter and/or select information that identifies a particular communication session and/or reciprocating user.

For example, informational elements 606 may display available information regarding exchange of information as selected by interface elements 602, 603, 604, and 605. For example, the information may include and/or be based on session-specific, channel-specific, and/or user-specific parameters related to the usage and/or operation of system 10, e.g. as obtained and/or determined by statistics component 30. Action button 612, upon activation by the user, may effect and/or confirm a user's request to refresh and/or display information in informational element 606. The particular initiating user may use interface element 605 to further refine, filter, and/or otherwise narrow down the selected exchanges of information in accordance with this disclosure. By way of non-limiting example, the exchange of information may be filtered using interface element 605 based on a particular geographic area that the reciprocating users are based in, interested in, and/or have a relation with in any other manner. In some embodiments, a particular initiating user may have used a first identifier "John" to exchange information with a first set of reciprocating users, and may have used a second identifier "James" to exchange information with a second set of reciprocating users. Through one or more user interfaces as described in this disclosure, the particular initiating user may manage, control, and/or modify the exchange of information per identifier. For example, the particular user may modify the timeframe of availability for all communication channels and/or all communication sessions pertaining to second identifier "James."

Figure 2:
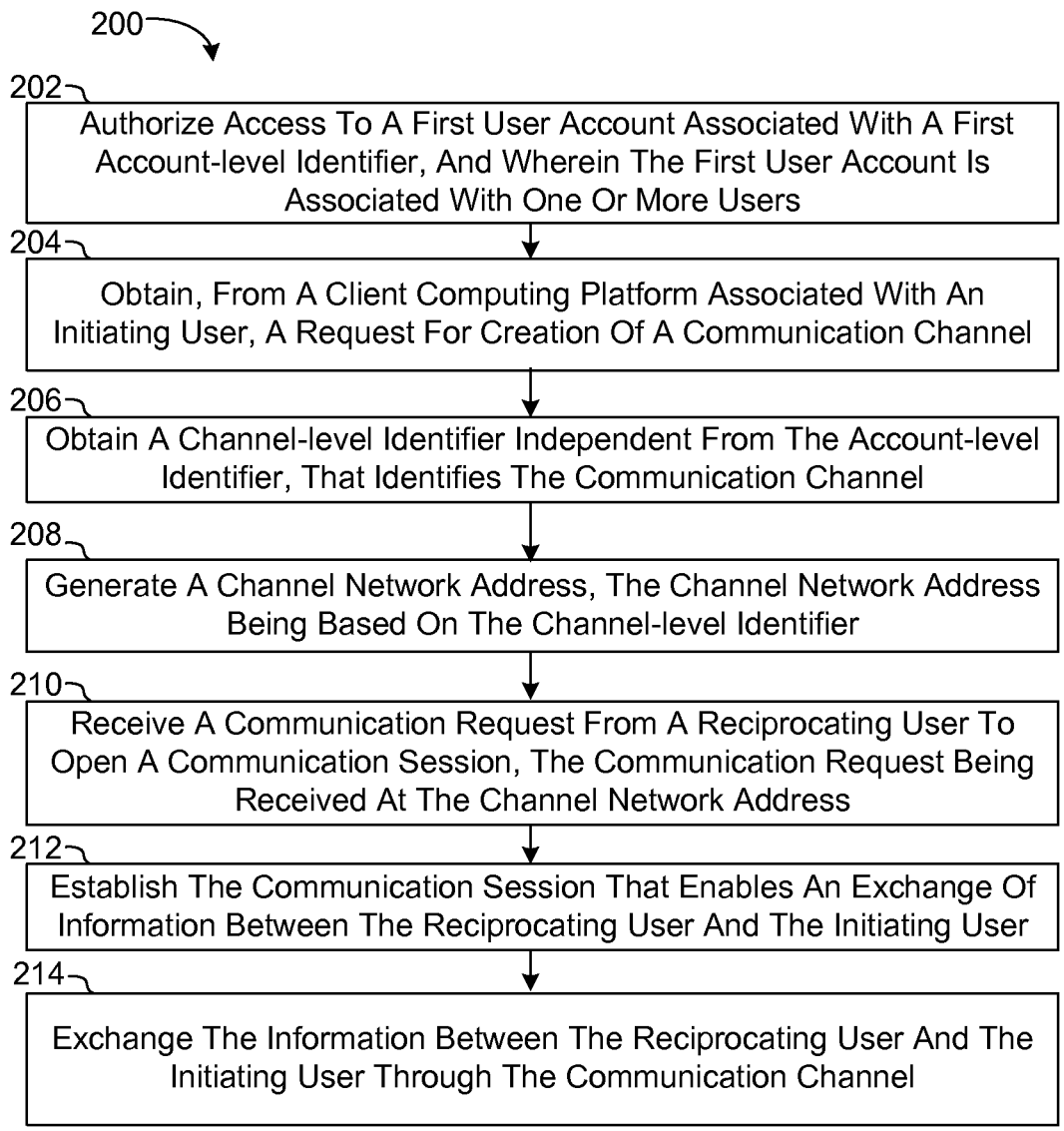
FIGS. 2, 3, and 4 illustrate methods for facilitating communication between users in accordance with one or more embodiments.
Figure 3:
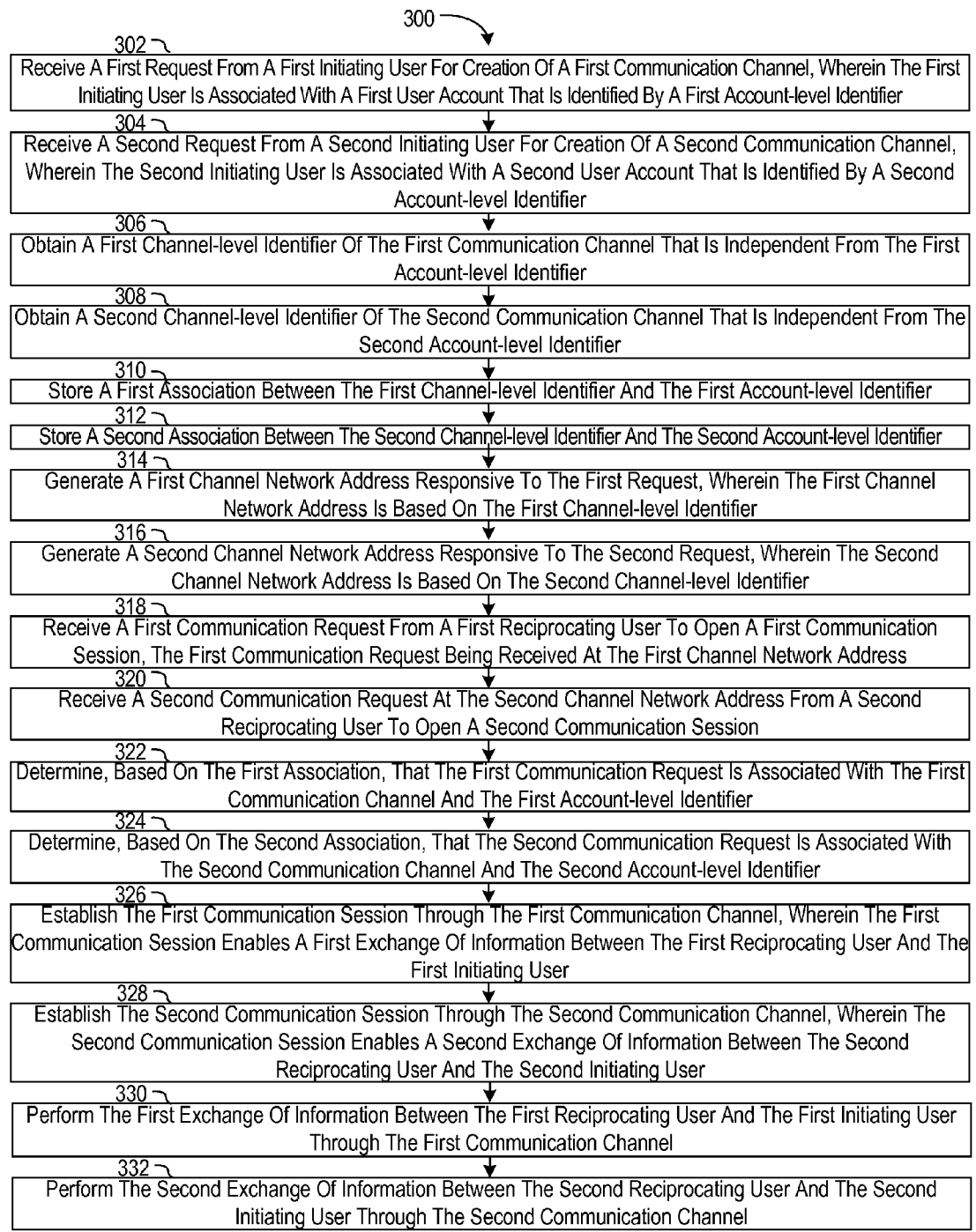
Figure 4:
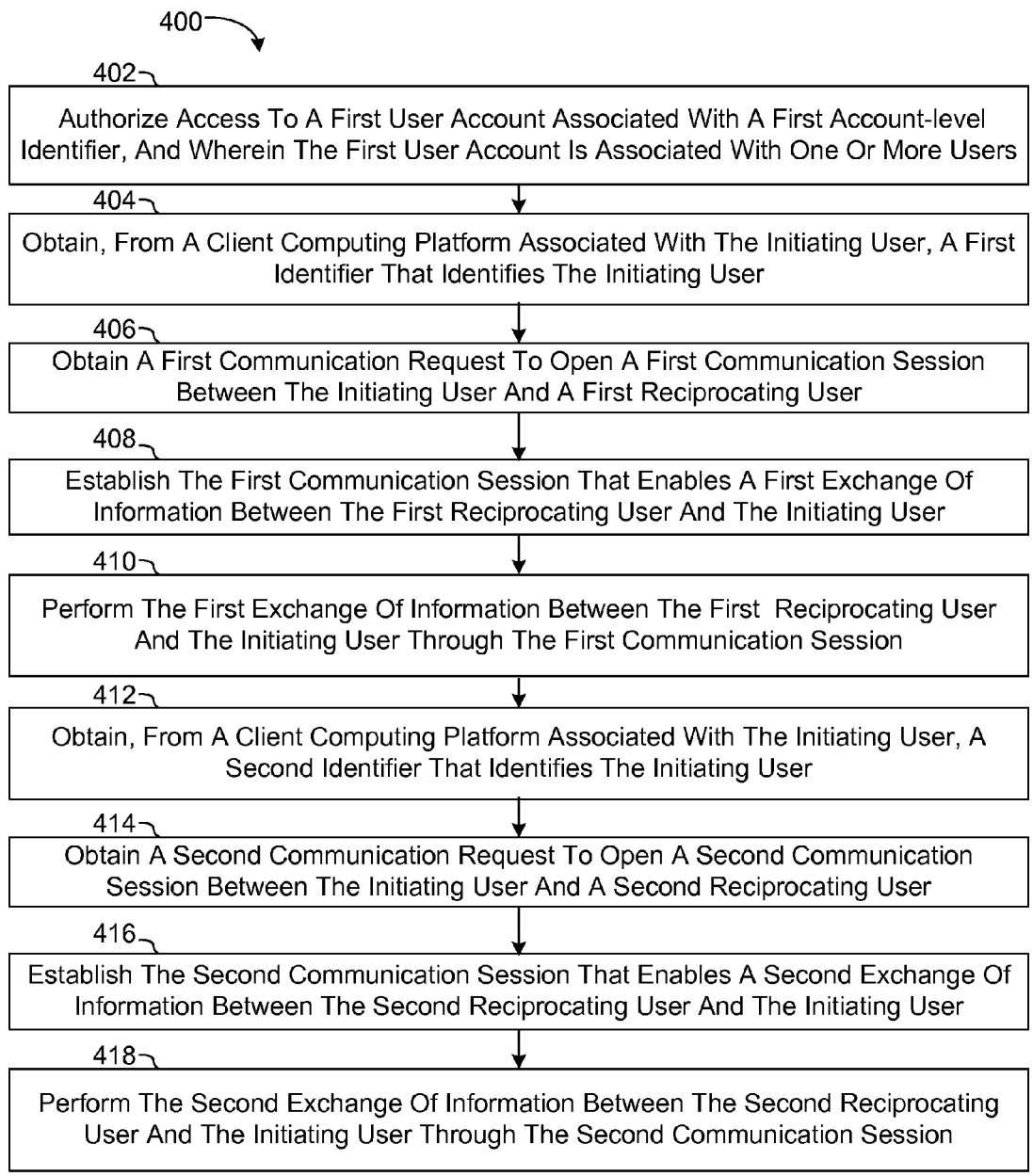

FIG. 2 and FIG. 3 and FIG. 4 illustrate three methods: a method 200, a method 300, and a method 400 for facilitating communication between users. Regarding method 200, at an operation 202, access to a first user account is authorized. The first user account is associated with a first account-level identifier that identifies the first user account. The first user account is associated with one or more users. In some embodiments, operation 202 is performed by an account management component the same as or similar to account management component 22 (shown in FIG. 1 and described herein).

At an operation 204, a request for creation of a communication channel is obtained from a client computing platform associated with an initiating user. In some embodiments, operation 204 is performed by a channel management component the same as or similar to channel management component 23 (shown in FIG. 1 and described herein).

At an operation 206, a channel-level identifier is obtained that is independent from the account-level identifier, the channel-level identifier identifying the communication channel. In some embodiments, operation 206 is performed by a channel management component the same as or similar to channel management component 23 (shown in FIG. 1 and described herein).

At an operation 208, a channel network address is generated based on the request. The channel network address is based on the channel-level identifier. In some embodiments, operation 208 is performed by an address generation component the same as or similar to address generation component 25 (shown in FIG. 1 and described herein).

At an operation 210, a communication request is received from a reciprocating user to open a communication session through the communication channel, the communication request being received at the channel network address. In some embodiments, operation 210 is performed by a communication request component the same as or similar to communication request component 26 (shown in FIG. 1 and described herein).

At an operation 212, the communication session is established through the communication channel. The communication session enables an exchange of information between the reciprocating user and the initiating user. In some embodiments, operation 212 is performed by a communication session component the same as or similar to communication session component 27 (shown in FIG. 1 and described herein).

At an operation 214, the information is exchanged between the reciprocating user and the initiating user through the communication channel. In some embodiments, operation 214 is performed by a communication session component the same as or similar to communication session component 27 (shown in FIG. 1 and described herein).

Regarding method 300, at an operation 302, a first request is received from a first client computing platform associated with a first initiating user, for creation of a first communication channel. The first initiating user is associated with a first user account. The first user account is identified by a first account-level identifier. In some embodiments, operation 302 is performed by a channel management component the same as or similar to channel management component 23 (shown in FIG. 1 and described herein).

At an operation 304, a second request is received from a second client computing platform associated with a second initiating user, for creation of a second communication channel. The second initiating user is associated with a second user account. The second user account is identified by a second account-level identifier. In some embodiments, operation 304 is performed by a channel management component the same as or similar to channel management component 23 (shown in FIG. 1 and described herein).

At an operation 306, a first channel-level identifier is obtained that is independent from the first account-level identifier, the first channel-level identifier identifying the first communication channel. In some embodiments, operation 306 is performed by a channel management component the same as or similar to channel management component 23 (shown in FIG. 1 and described herein).

At an operation 308, a second channel-level identifier is obtained that is independent from the second account-level identifier, the second channel-level identifier identifying the second communication channel. In some embodiments, operation 308 is performed by a channel management component the same as or similar to channel management component 23 (shown in FIG. 1 and described herein).

At an operation 310, a first association is stored between the first channel-level identifier and the first account-level identifier. In some embodiments, operation 310 is performed by an identity management component the same as or similar to identity management component 24 (shown in FIG. 1 and described herein).

At an operation 312, a second association is stored between the second channel-level identifier and the second account-level identifier. In some embodiments, operation 312 is performed by an identity management component 24 the same as or similar to identity management component 24 (shown in FIG. 1 and described herein).

At an operation 314, a first channel network address is generated responsive to the first request. The first channel network address is based on the first channel-level identifier. In some embodiments, operation 314 is performed by a address generation component the same as or similar to address generation component 25 (shown in FIG. 1 and described herein).

At an operation 316, a second channel network address is generated responsive to the second request. The second channel network address is based on the second channel-level identifier. In some embodiments, operation 316 is performed by a address generation component the same as or similar to address generation component 25 (shown in FIG. 1 and described herein).

At an operation 318, a first communication request is received from a first reciprocating user to open a first communication session, the first communication request being received at the first channel network address. In some embodiments, operation 318 is performed by a communication request component the same as or similar to communication request component 26 (shown in FIG. 1 and described herein).

At an operation 320, a second communication request is received from a second reciprocating user to open a second communication session, the second communication request being received at the second channel network address. In some embodiments, operation 320 is performed by a communication request component the same as or similar to communication request component 26 (shown in FIG. 1 and described herein).

At an operation 322, it is determined, based on the first association, that the first communication request is associated with the first communication channel and the first account-level identifier. In some embodiments, operation 322 is performed by an identity management component the same as or similar to identity management component 24 (shown in FIG. 1 and described herein).

At an operation 324, it is determined, based on the second association, that the second communication request is associated with the second communication channel and the second account-level identifier. In some embodiments, operation 324 is performed by an identity management component the same as or similar to identity management component 24 (shown in FIG. 1 and described herein).

At an operation 326, the first communication session is established through the first communication channel. The first communication session enables a first exchange of information between the first reciprocating user and the first initiating user. In some embodiments, operation 326 is performed by a communication session component the same as or similar to communication session component 27 (shown in FIG. 1 and described herein).

At an operation 328, the second communication session is established through the second communication channel. The second communication session enables a second exchange of information between the second reciprocating user and the second initiating user. In some embodiments, operation 328 is performed by a communication session component the same as or similar to communication session component 27 (shown in FIG. 1 and described herein).

At an operation 330, the first exchange of information is performed between the first reciprocating user and the first initiating user through the first communication channel. In some embodiments, operation 330 is performed by a communication session component the same as or similar to communication session component 27 (shown in FIG. 1 and described herein).

At an operation 332, the second exchange of information is performed between the second reciprocating user and the second initiating user through the second communication channel. In some embodiments, operation 332 is performed by a communication session component 27 the same as or similar to communication session component 27 (shown in FIG. 1 and described herein).

Regarding method 400, at an operation 402, access is authorized to a first user account. The first user account is associated with a first account-level identifier that identifies the first user account. The first user account is associated with one or more users. In some embodiments, operation 402 is performed by an account management component the same as or similar to account management component 22 (shown in FIG. 1 and described herein).

At an operation 404, a first identifier is obtained, from a client computing platform associated with the initiating user. The first identifier identifies the initiating user. In some embodiments, operation 404 is performed by an account management component 22 the same as or similar to account management component 22 (shown in FIG. 1 and described herein).

At an operation 406, a first communication request is obtained to open a first communication session between the initiating user and a first reciprocating user. In some embodiments, operation 406 is performed by a communication request component the same as or similar to communication request component 26 (shown in FIG. 1 and described herein).

At an operation 408, the first communication session is established. The first communication session enables a first exchange of information between the first reciprocating user and the initiating user. In some embodiments, operation 408 is performed by a communication session component the same as or similar to communication session component 27 (shown in FIG. 1 and described herein).

At an operation 410, the first exchange of information is performed between the first reciprocating user and the initiating user through the first communication session. In some embodiments, operation 410 is performed by a communication session component the same as or similar to communication session component 27 (shown in FIG. 1 and described herein).

At an operation 412, a second identifier is obtained, from the client computing platform associated with the initiating user. The second identifier identifies the initiating user. In some embodiments, operation 412 is performed by an account management component 22 the same as or similar to account management component 22 (shown in FIG. 1 and described herein).

At an operation 414, a second communication request is obtained to open a second communication session between the initiating user and a second reciprocating user. In some embodiments, operation 414 is performed by a communication request component the same as or similar to communication request component 26 (shown in FIG. 1 and described herein).

At an operation 416, the second communication session is established. The second communication session enables a second exchange of information between the second reciprocating user and the initiating user. In some embodiments, operation 416 is performed by a communication session component the same as or similar to communication session component 27 (shown in FIG. 1 and described herein).

At an operation 418, the second exchange of information is performed between the second reciprocating user and the initiating user through the second communication session. In some embodiments, operation 410 is performed by a communication session component the same as or similar to communication session component 27 (shown in FIG. 1 and described herein).

The operations of methods 200, 300, and 400 presented herein are intended to be illustrative. In some embodiments, methods 200, 300, and 400 may be accomplished with one or more additional operations not described, and/or without one or more of the operations discussed. Additionally, the order in which the operations of methods 200, 300, and 400 are illustrated in FIG. 2, FIG. 3, and FIG. 4 and described herein is not intended to be limiting.

In some embodiments, methods 200, 300, and 400 may be implemented in one or more processing devices (e.g., a server, a digital processor, an analog processor, a digital circuit designed to process information, an analog circuit designed to process information, a state machine, and/or other mechanisms for electronically processing information). The one or more processing devices may include one or more devices executing some or all of the operations of methods 200, 300, and 400 in response to instructions stored electronically on an electronic storage medium. The one or more processing devices may include one or more devices configured through hardware, firmware, and/or software to be specifically designed for execution of one or more of the operations of methods 200, 300, and 400.

Although the system(s) and/or method(s) of this disclosure have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any implementation or embodiment can be combined with one or more features of any other implementation or embodiment.

What is claimed is:

1. A system configured to facilitate real-time communication between users, the system comprising:
   one or more physical processors configured via computer-readable instructions to:
   manage user accounts including account information of users, wherein the user accounts include a first user account and a second user account, wherein the first user account is identified by a first account-level identifier that identifies the first user account, wherein the second user account is identified by a second account-level identifier that identifies the second user account, wherein the first user account is associated with one or more users, and wherein the second user account is associated with one or more users;
   obtain, from a first client computing platform associated with a first initiating user, a first request for creation of a first communication channel, wherein the first initiating user is associated with the first user account;
   obtain, from a second client computing platform associated with a second initiating user, a second request for creation of a second communication channel, wherein the second initiating user is associated with the second user account;
   obtain a first channel-level identifier that is independent from the first account-level identifier, the first channel-level identifier identifying the first communication channel;
   obtain a second channel-level identifier that is independent from the second account-level identifier, the second channel-level identifier identifying the second communication channel;
   store a first association between the first channel-level identifier and the first account-level identifier;
   store a second association between the second channel-level identifier and the second account-level identifier;
   generate a first channel network address responsive to the first request, wherein the first channel network address is based on the first channel-level identifier;
   generate a second channel network address responsive to the second request, wherein the second channel network address is based on the second channel-level identifier;
   receive a first communication request from a first reciprocating user to open a first communication session through the first communication channel, the first communication request being received at the first channel network address, wherein the first communication request is received from a third client computing platform associated with the first reciprocating user;
   receive a second communication request from a second reciprocating user to open a second communication session through the second communication channel, the second communication request being received at the second channel network address, wherein the second communication request is received from a fourth client computing platform associated with the second reciprocating user;
determine, based on the first association, that the first communication request is associated with the first communication channel and the first account-level identifier;
determine, based on the second association, that the second communication request is associated with the second communication channel and the second account-level identifier;
establish the first communication session through the first communication channel, wherein the first communication session enables a first exchange of information between the first reciprocating user and the first initiating user;
establish the second communication session through the second communication channel, wherein the second communication session enables a second exchange of information between the second reciprocating user and the second initiating user;
perform the first exchange of information between the first reciprocating user and the first initiating user through the first communication channel; and
perform the second exchange of information between the second reciprocating user and the second initiating user through the second communication channel.

2. The system of claim 1, wherein the first channel network address is a universal resource locator (URL).

3. The system of claim 1, wherein both the first initiating user and the first account-level identifier are anonymous to the first reciprocating user.

4. The system of claim 1, wherein the first channel network address is further based on an identifier that is associated with the first user account.

5. The system of claim 1, wherein the one or more physical processors are further configured to authorize access to the first user account.

6. The system of claim 1, wherein the first channel network address is publicly accessible to the first reciprocating user.

7. The system of claim 1, wherein the first exchange of information through the first communication channel is based on Web Real-Time Communication (WebRTC).

8. The system of claim 1, wherein the first exchange of information is supported by a default installation of a browser application on the third client computing platform.

9. The system of claim 1, wherein the one or more physical processors are further configured to:
generate a session network address for the first communication session responsive to the first communication request, the session network address being different than the first channel network address;
wherein the first exchange of information between the first reciprocating user and the first initiating user is performed through the session network address.

10. The system of claim 1, wherein the first communication session is identified by a session identifier, wherein the session identifier is based on a session network address, wherein the first exchange of information is redirected to the session network address.

11. The system of claim 1, wherein the first request for creation of the first communication channel specifies one or more communication types, wherein the first exchange of information through the first communication channel is based on a communication type in accordance with the one or more specified communication types.

12. The system of claim 11, wherein the one or more communication types include text messaging, bidirectional audio, and bidirectional video.

13. The system of claim 1, wherein the one or more physical processors are further configured to:
obtain, from the first client computing platform associated with the first initiating user, a third request for creation of a third communication channel;
obtain a third channel-level identifier that is independent from the first account-level identifier, the third channel-level identifier identifying the third communication channel;
store a third association between the third channel-level identifier and the first account-level identifier;
generate a third channel network address based on the third request, wherein the third channel network address is based on the third channel-level identifier;
receive a third communication request from a third reciprocating user to open a third communication session through the third communication channel, the third communication request being received at the third channel network address;
establish a third communication session through the third communication session, wherein the third communication channel enables a third exchange of particular information between the third reciprocating user and the first initiating user; and
perform the third exchange of the particular information between the third reciprocating user and the first initiating user through the third communication channel.

14. The system of claim 1, wherein the establishment of the first communication session includes presentation of a first user interface to the first initiating user and a second user interface to the first reciprocating user.

15. The system of claim 14, wherein the one or more physical processors are further configured to:
determine one or more session-specific, channel-specific, and/or user-specific parameters that indicate an average response time, by the first initiating user, to initiation of the first exchange of information by the first reciprocating user;
present the determined one or more session-specific, channel-specific, and/or user-specific parameters through the first user interface.

16. The system of claim 1, wherein the first request for creation of the first communication channel includes a description of a timeframe, wherein the exchange of information through the first communication channel is supported during the timeframe, and wherein the exchange of information through the first communication channel is not supported outside the timeframe.

17. The system of claim 1, wherein the one or more physical processors are further configured to:
receive, from the first initiating user associated with the first account-level identifier, a channel deletion request to delete the first communication channel;
delete, responsive to receipt of the channel deletion request, the first communication channel,
wherein, responsive to receipt of the first communication request at the first network address, the first communication session is not established and no first exchange of information is performed between the first reciprocating user and the first initiating user.

18. The system of claim 1, wherein the first request for creation of the first communication channel specifies one or more communication types that are supported for the first exchange of information through the first communication channel, wherein the one or more physical processors are further configured to:
receive, from the first initiating user, a channel modification request to modify the first communication channel; and
modify, responsive to receipt of the channel modification request, the one or more communication types that are supported for the first exchange of information through the first communication channel, wherein the modified one or more communication types are in accordance with the channel modification request.

19. The system of claim 1, wherein the one or more physical processors are further configured to generate a quick response (QR) code that represents the first channel network address.

20. A computer-implemented method for facilitating real-time communication between users, the method being implemented in a computer system that includes one or more physical processors, the method comprising:
receiving, from a first client computing platform associated with a first initiating user, a first request for creation of a first communication channel, wherein the first initiating user is associated with a first user account, wherein the first user account is identified by a first account-level identifier;
receiving, from a second client computing platform associated with a second initiating user, a second request for creation of a second communication channel, wherein the second initiating user is associated with a second user account, wherein the second user account is identified by a second account-level identifier;
obtaining a first channel-level identifier that is independent from the first account-level identifier, the first channel-level identifier identifying the first communication channel;
obtaining a second channel-level identifier that is independent from the second account-level identifier, the second channel-level identifier identifying the second communication channel;
storing a first association between the first channel-level identifier and the first account-level identifier;
storing a second association between the second channel-level identifier and the second account-level identifier;
generating a first channel network address responsive to the first request, wherein the first channel network address is based on the first channel-level identifier;
generating a second channel network address responsive to the second request, wherein the second channel network address is based on the second channel-level identifier;
receiving a first communication request from a first reciprocating user to open a first communication session, the first communication request being received at the first channel network address;
receiving a second communication request from a second reciprocating user to open a second communication session, the second communication request being received at the second channel network address;
determining, based on the first association, that the first communication request is associated with the first communication channel and the first account-level identifier;
determining, based on the second association, that the second communication request is associated with the second communication channel and the second account-level identifier;
establishing the first communication session through the first communication channel, wherein the first communication session enables a first exchange of information between the first reciprocating user and the first initiating user;
establishing the second communication session through the second communication channel, wherein the second communication session enables a second exchange of information between the second reciprocating user and the second initiating user;
performing the first exchange of information between the first reciprocating user and the first initiating user through the first communication channel; and
performing the second exchange of information between the second reciprocating user and the second initiating user through the second communication channel.

21. The method of claim 20, further comprising:
modifying the first association such that the first association is between the first channel-level identifier and the second account-level identifier;
responsive to the modifying, receiving a third communication request from a third reciprocating user to open a third communication session, the third communication request being received at the first channel network address;
determining, based on the modified first association, that the third communication request is associated with the first communication channel and the second account-level identifier;
establishing the third communication session through the first communication channel, wherein the third communication session enables a third exchange of information between the third reciprocating user and the second initiating user; and
performing the third exchange of information between the third reciprocating user and the second initiating user through the first communication channel.

22. The method of claim 20, wherein the first channel network address is a universal resource locator (URL).

23. The method of claim 20, wherein both the first initiating user and the first account-level identifier are anonymous to the first reciprocating user.

24. The method of claim 20, wherein the first channel network address is publicly accessible to the first reciprocating user.

25. The method of claim 20, wherein the first exchange of information through the first communication channel is based on Web Real-Time Communication (WebRTC).

26. The method of claim 20, wherein the first request for creation of the first communication channel specifies one or more communication types, wherein the first exchange of information through the first communication channel is based on a communication type in accordance with the one or more specified communication types.

27. The method of claim 26, wherein the one or more communication types include text messaging, bidirectional audio, and bidirectional video.

28. The method of claim 20, wherein the first request for creation of the first communication channel includes a description of a timeframe, wherein the exchange of information through the first communication channel is supported during the timeframe, and wherein the exchange of information through the first communication channel is not supported outside the timeframe.

* * * * *